March 30, 1948.   W. F. KRENZKE   2,438,669
MOTOR FUEL POWER INDUCTION DEVICE
Original Filed Jan. 4, 1943   4 Sheets-Sheet 1

INVENTOR.
WILLIAM F. KRENZKE
DEC'D.
BY
ATTORNEY

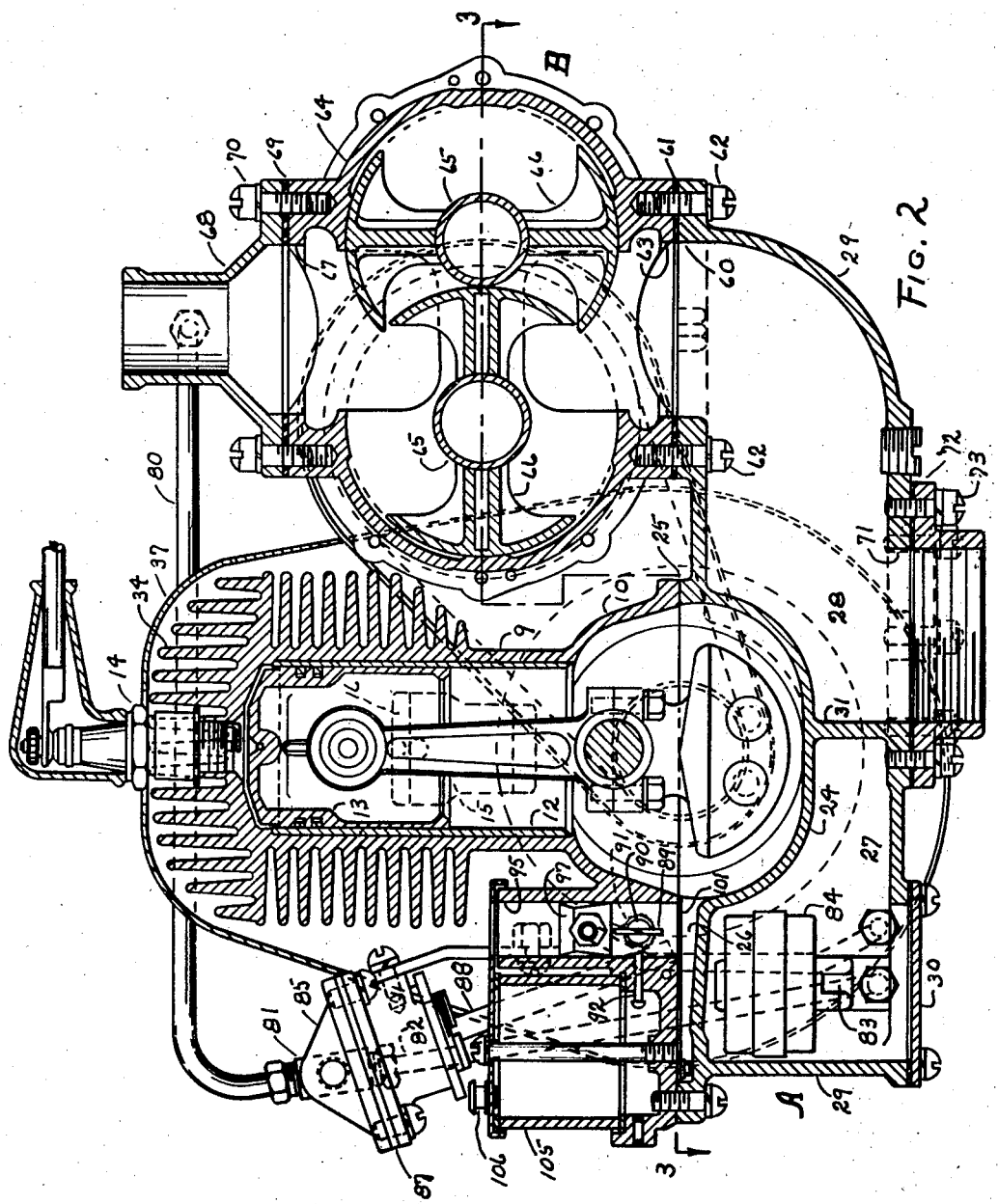

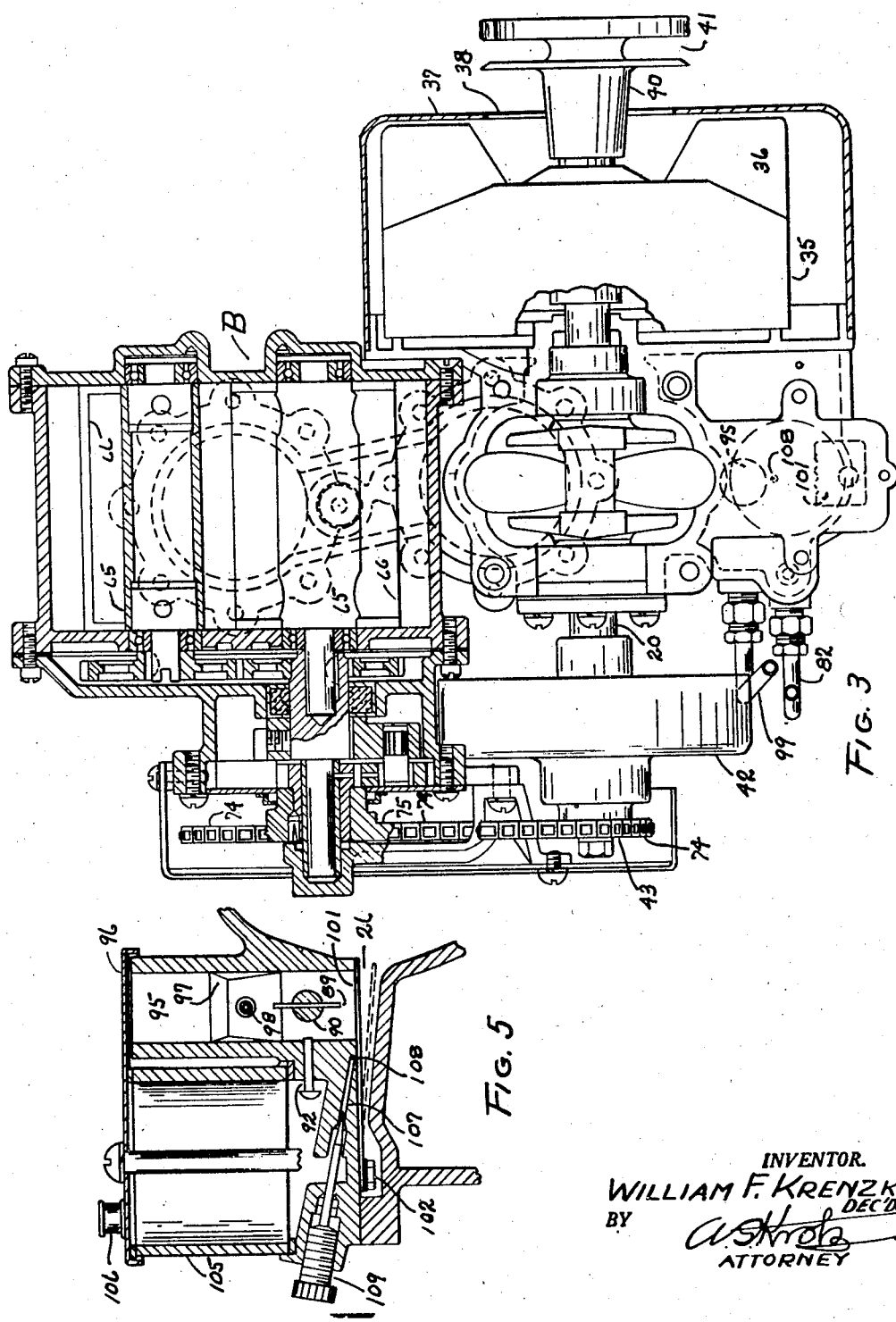

March 30, 1948.  W. F. KRENZKE  2,438,669
MOTOR FUEL POWER INDUCTION DEVICE
Original Filed Jan. 4, 1943  4 Sheets-Sheet 4
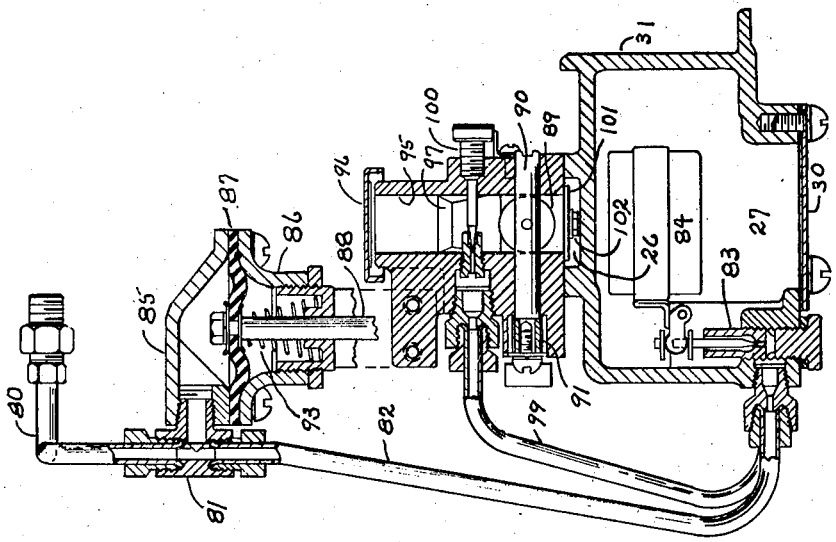
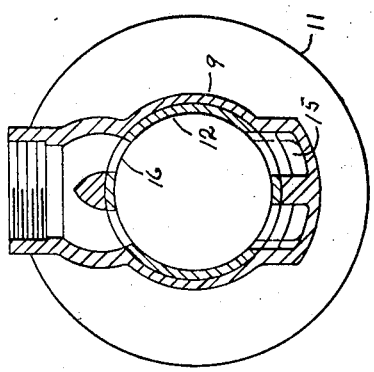
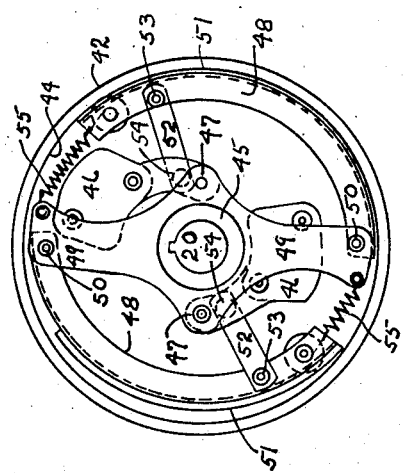
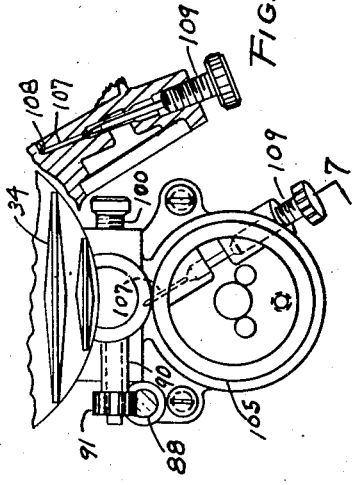
INVENTOR.
WILLIAM F. KRENZKE
DEC'D.
BY A.S. Kroh
ATTORNEY Patented Mar. 30, 1948

2,438,669

UNITED STATES PATENT OFFICE 2,438,669

MOTOR FUEL POWER INDUCTION DEVICE

William F. Krenzke, deceased, late of Racine, Wis.; E. A. Jacobsen, special administrator of said William F. Krenzke, assignor to Jacobsen Manufacturing Company, Racine, Wis., a corporation of Wisconsin Original application January 4, 1943, Serial No. 471,292, now Patent No. 2,397,457, dated March 26, 1946. Divided and this application February 11, 1946, Serial No. 646,779

6 Claims. (Cl. 123—72)

The present invention is a divisional of pending application Serial No. 471,292, filed January 4, 1943, maturing in Patent No. 2,397,457, March 26, 1946, Motor fuel power induction device, William F. Krenzke.

The present invention relates to miniature automatically operated and manually transported power units for the induction of motor fuel into the fuel tanks of airplanes, army tanks and the like from fuel barrels of the type commonly used for transporting and moving the fuel to and about airports and army camps.

The general practice in the use of the device is to move the fuel containers to the device to be serviced and then impel the fuel from the container into the fuel tanks.

An object of the present invention is to provide an internal combustion engine having a fuel impelling pump with regulating means whereby when the delivery nozzle is closed, the speed of the engine will be considerably reduced, the pump being driven by the engine by means of a centrifugally controlled clutch so the pump discontinues to operate when the speed of the engine is sufficiently reduced.

A further object of the invention is to provide a power device of the character which is very light and can be easily carried by an attendant.

Another object of the present invention is to provide an internal combustion engine having a crank chamber and integrally formed chambers under the crank chamber for the reception of the engine fuel supply and for a passageway from the suction pipe to the impelling pump.

In the present invention, it provides a lubricating oil container adjacent the carburetor and means whereby a small quantity of oil is metered into the inlet of the engine while operating, this is brought about by the use of a reed valve which covers a small oil port and the air inlet from the carburetor into the crankcase, whereby the volume of air or mixture regulates the volume of oil fed into the crank case.

A further object of the present invention is to provide an engine crank having ball bearings and sealing means thus to reduce the amount of oil needed to a minimum.

A still further object of the invention is to provide cooling fins on the cylinder and blades on the fly-wheel and having means for directing a blast of air between the cooling fins.

Another object of the present invention is to provide an impeller fuel pump which can be made largely of aluminum and an engine wherein the housing and cylinder proper are made from aluminum, the cylinder having a cast iron alloy sleeve for contact with the piston and further to provide an automatically controlled carburetor and throttle valve.

The above recited objects are accomplished by means of parts, combinations of parts, or their equivalents, and mode of operation, as hereinafter set forth and claimed and shown in the accompanying drawings in which:

Fig. 2 is a transverse sectional view of my device, taken on line 2—2 of Figure 1.

Fig. 3 is a horizontal offset view of the device on line 3—3 of Figure 2.

Fig. 4 is a transverse vertical sectional view of the carburetor and its controlling means.

Fig. 5 is a transverse vertical section of a fraction of the carburetor and taken through the center of the lubricating oil device.

Fig. 6 is a partially sectioned view of the carburetor and lubricating oil retainer illustrating a fraction of the engine cylinder.

Fig. 7 is a sectional view through the lubricating oil metering valve taken on line 7 of Figure 6.

Fig. 8 is a horizontal section through the cylinder taken on line 8—8 of Figure 1.

Fig. 9 illustrates the clutch mechanism viewed from the engine side.

Figure 1:
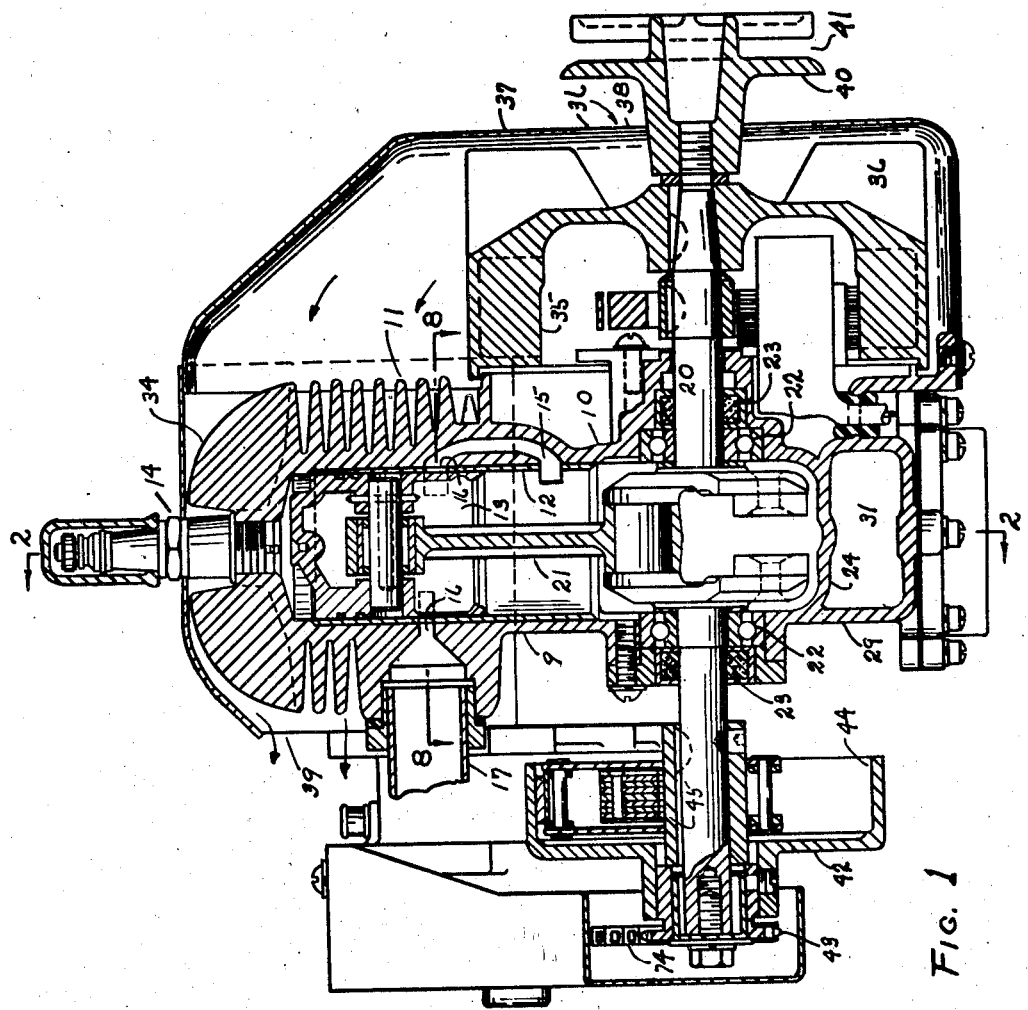
Fig. 1 is a longitudinal vertical sectional view of my device taken on the cylinder and crank centers.

As thus illustrated, the engine cylinder 9 and upper half of crank case 10 are preferably cast from aluminum, the cylinder having spaced fins 11 for cooling the cylinder by means of a blast of air as will hereinafter appear.

The cylinder is provided with a wearing sleeve 12 and a piston 13, the piston being shaped about as illustrated in Figures 1 and 2. In the top of the cylinder, is provided a conventional spark plug 14 which is supplied with an impulse or impulses of electric current from an electric device too well known to require further description.

By referring to Figure 1, it will be noted that the engine is what is commonly called "two cycle" having a port 15 which registers with a port 16 in sleeve 12. Port 15 is uncovered at its top when the piston is in its lowest position as is the custom in two cycle engines of the class. The exhaust port 16 is positioned on the opposite side of the cylinder from the top of port 15 and extends through the wall of sleeve 12 and cylinder 9 into an exhaust pipe 17.

The crank shaft of the device is designated by numeral 20 and is connected to the piston by means of a connecting rod 21, the crank being mounted on ball bearings 22—22, each having sealing means 23—23 to prevent leakage between the crank chamber and the exterior.

The lower part of the crank chamber (see Figure 2) is provided with a partition 24 which is gasket sealed and bolted to the upper part of the crank case as at 25. Member 24 is shaped so as to provide a passageway 26 which extends under the upper half of the carburetor as illustrated in Figure 2.

In the figures, the bottom half of the crank case in its entirety is designated by reference character A and is provided with a fuel chamber 27 and an induction pump inlet chamber 28 formed by an outer wall 29, the bottom plate 30 and a partition 31.

There is provided a fly-wheel 35 on one end of crank 20 having spaced blades 36 arranged to act as a blower fan, the air being directed around the cylinder by means of a housing 37 having an opening 38 for an air inlet to the fan, the upper portion of the housing being shaped substantially as illustrated in Figures 1 and 2 so as to direct the air blast around the cylinder and between fins 11, as indicated by arrows. The upper end of the cylinder is provided with fins 34 which are positioned as shown in the line of air movement as indicated by arrows, the air being discharged at opening 39 at the opposite side of the engine.

Preferably on the fly-wheel end of crank 20, is secured sheave 40 having a groove 41 into which a rope or cable may be wound with which to start the engine. On the other end of shaft 20, is provided an outer clutch member 42 having a sprocket 43 on its outer end and an inner surface 44 adapted to be engaged by a centrifugally operated clutch as follows:

There is secured a hub 45 to shaft 20 (see Figure 9) and hingedly mount weights 46—46 to this hub as at 47. Brake bands 48—48 are hingedly mounted on arms 49—49 which are an integral part of member 45 as at 50—50. Members 48 are supplied with suitable fabric strips 51.

Near the free ends of members 48 are hingedly connected links 52—52 as at 53, the inner ends of these links being connected to member 46 as at 54—54. It will be seen that an outward movement of weights 46 will force bands 51 in contact with surface 44.

There is provided springs 55—55 which are suitably secured to members 49 as illustrated in Figure 9 and to the free ends of members 48 thus to yieldingly counteract the outward movement of members 46, the springs being adapted to permit engagement of the clutch at a predetermined speed for a purpose as will hereinafter appear.

There is provided an outlet opening 60 for part 28. On this opening I bind and seal preferably a rotary pump, which in its entirety is designated by reference character B, by means of a gasket 61 and bolts 62. Port 63 forms a connection between outlet 60 and the inlet side of the pump, the pump proper comprising a housing 64 suitably machined for the rotatably mounted shafts 65—65 and for pump rotors 66—66.

At the top of housing 64 there is provided an outlet 67 on which is mounted an outlet bracket 68 by means of gaskets 69 and bolts 70. Chamber 28 is provided with an inlet opening 71 and to this opening is secured a flanged member 72 by means of a suitable gasket and bolts 73. Member 72 is provided with a suction pipe (not shown) of a length suitable for extending into the fuel barrel and to within a very short distance from the bottom thereof so practically all of the fuel will be removed from the barrel when the pump is in operation and discharged through outlet bracket 68 through a flexible hose connection (not shown) somewhat similar to the hose connection and nozzle supplied on filling station pumps. The nozzle is provided with a valve (not shown) so when the airplane tank is full or the barrel is empty, the nozzle may be closed.

The pressure that accumulates in pump outlet bracket 68 is adapted to supply fuel to the carburetor and control the engine speed as will hereinafter appear.

Clutch sprocket 43 is operatively connected to one of the shafts of pump B by means of a chain 74 and a sprocket 75 which is secured to one of the shafts of pump B, the other shafts of the pump being operatively connected to the first shaft by means of suitable gears (see Figure 3).

When the engine is reduced to a predetermined speed because of the pressure in bracket 68, as will hereinafter appear, the clutch will be disengaged and the pump will stop operating so the operator may either insert the suction pipe into another barrel or carry the outfit to another airplane or the like for filling the fuel tank thereof. It will be noted by observing Figure 9 that weights 46 act centrifugally to engage sectors 48 and that when the engine speed is low enough springs 55 will overcome centrifugal force and disengage the sectors, thus the operating connection between the engine and pump is controlled by the pressure in bracket 68.

It will be understood that there is illustrated the preferred form of fuel pump and preferred connection from this pump to the clutch. The device may however be equipped with other designs of fuel pumps and power connections thereto. In either event, the operation of the device will not be affected.

The operation of the carburetor speed controlling means and oil feed is as follows:

There is provided a fuel line 80 which leads to a T fitting 81 having a fuel connection 82 which leads to the carburetor valve 83 which is controlled in the usual manner by means of a float 84; thus to maintain a suitable level of fuel in chamber 27.

The side outlet of fitting 81 is screwed into a cap 85 which forms the cover of a member 86. There is positioned between these two members a diaphragm 87 having a rod 88 which extends downwardly and controls the throttle valve 89 as follows:

Valve 89 is mounted on a shaft 90 (see Figures 4 and 6) having a pinion 91 and member 88 is supplied with teeth forming a rack which engages the teeth on pinion 91. The position of rod 88 will therefore determine the position of valve 89. The object of this construction is to hold the valve open by means of a spring 93 when there is a certain pressure in the chamber 94. This pressure is caused by the weight of the fuel in the flexible tube connected to member 68 and when the nozzle valve on the end of this tube is closed, diaphragm 87 will act to close valve 89.

Spring 93 is adapted to close valve 89 when there is no pressure in chamber 94. Member 87 is made of material which will make it delicate in its operation and spring 93 is delicate and having adjusting means, as illustrated, so the operator can adjust the spring and determine the pressure which will hold the valve open. Clearly when the tank being filled is full and the delivery valve is closed, the engine will be reduced to a predetermined idling speed, the idling speed being low enough to cause weights 46 to disengage the clutch, this clearly will result in discontinuing the operation of the pump and when the valve in the nozzle is again opened, for purposes which will be obvious, the pressure in chamber 94 will again be reduced to a point where the engine will speed up and the clutch will be engaged so as to drive the pump. Clearly the operation of the pump will be determined by the position of the valve in the nozzle of the fuel pipe or the weight of the oil in this pipe.

It will be seen that because of the rack on the end of rod 88 and the pinion 91, the valve may be closed by an extreme movement of the diaphragm in either direction, that if the nozzle valve is closed, excessive pressure in chamber 94 will close valve 89 and immediately upon opening the nozzle valve, valve 89 will again be opened and that if there is no pressure at all in chamber 68, valve 89 will be closed because the rack will act to turn the valve from its open position to its closed or idling position in either direction.

There is provided a pin 92, the end of which is adapted to prevent the valve from entirely closing when in either extreme direction or prevent it from passing the closed center and open again. It will be seen that the idling position of valve 89 will be determined by pin 92 and that the idling speed of the engine is therefore determined by this pin. It will also be seen that lack of a predetermined pressure in chamber 94, or excessive pressure in this chamber, because of the nozzle valve being shut, will cause the engine to be reduced to idling speed and the pump will be stopped.

The carburetor and lubricating oil devices are preferably made in two parts, the fuel chamber being cast integral with the bottom half of crank case A and the upper half is preferably cast integral with the upper half of the crank case (see Figure 2).

The upper half of the carburetor is provided with an inlet 95 having a cap 96 positioned over this inlet so as to prevent dust from dropping into the inlet but permit sufficient air to enter for operating the engine (see Figure 4). There is provided a Venturi-shaped sleeve 97 in opening 95 having an inlet nozzle 98 which is operatively connected to chamber 31 by means of a tube 99.

There is provided a needle valve stem 100 which, in the usual fashion, will more or less open the outlet in member 98 so as to regulate the fuel drawn from chamber 31 because of the vacuum caused by Venturi sleeve 97; thus when the air rushes downwardly through the Venturi sleeve, a predetermined quantity of fuel will be drawn into the air current as it passes member 98. Opening 95 extends down to the bottom of the casting and this opening is closed at its bottom by means of a reed valve 101 which is secured to the casting by means of a bolt 102 (see Figure 5).

Chamber 26 provides room for valve 101 to open during the suction stroke of the engine (see dotted lines in Figure 5). When valve 89 is closed for idling, clearly reed valve 101 will also be closed for idling.

There is provided means afor supplying a suitable amount of lubricating oil to the engine as follows:

The upper half of the carburetor is shaped for the reception of a glass tube 105 supplied so the operator may observe the amount of lubricating oil in the chamber. A suitable filler cap or plug 106 is provided.

In the bottom of the lubricating oil chamber, there is provided an outlet opening 107 having an opening 108 adjacent member 95 and in the seat of reed valve 101. There is supplied an adjustable needle valve 109 so opening 107 may be more or less closed so as to supply the desired quantity of lubricating oil to the engine, the oil being permitted to flow into the crank case with the air passing through opening 95 because of the position of valve 101.

Clearly when the engine is not operating, there will be no oil supplied to the engine because opening 108 will be closed by valve 101. The desired quantity of oil supplied to the engine when operating can be secured by adjusting valve 109.

It will be understood that the volume of mixture passing into the crankcase will be reflected in the proper proportion of movement in reed valve 101. In small two cycle engines it has been the practice to mix oil in the gasoline for lubricating the engine. This method is not at all satisfactory. The method herein described has been found far superior to the conventional method because oil in the proper amount is metered into the crank case.

Obviously the speed of the engine may be controlled manually instead of my diaphragm 87 and its connection to the pump outlet. Such control is too well known to require further illustration or description.

It will be seen that the speed of the engine may be controlled automatically, the operation of the pump is automatic as determined by the speed of the engine and the supply of oil to the engine is controlled automatically. Clearly the engine, pump, carburetor and clutch are light, easily manufactured at low cost, efficient and easily handled by the operator.

By scrutinizing Figure 2, it will be seen that inlet 71 is positioned near the center of gravity of the unit; thus the device will readily assume a vertical position.

Clearly the operator can place the pump suction pipe in various supply barrels or move the nozzle to various airplane fuel tanks for filling while the engine is idling and that the engine valve can be made to idle the engine automatically when there is no pressure in the pump outlet.

It will be understood that many minor detail changes may be made without departing from the spirit and scope of the present invention, as recited in the appended claims.

Having thus shown and described the invention, which is claimed:

1. A two cycle internal combustion engine of the character described, including a carburetor having a valve outlet into the crank case of the engine, an oil compartment adjacent said carburetor having an outlet aperture adapted to be closed when said valve is closed whereby when the engine is operating normally the valve will open the aperture and permit a quantity of oil relative to the mixture volume to enter the crank case of the engine with the air and fuel, said valve comprising an elongated thin sheet of metal having spring characteristics, one end being anchored and the other end at certain times lying on the outlet from the carburetor and said aperture.

2. A device of the character described comprising, a two cycle internal combustion engine, a carburetor having an outlet, an elongated flat upper surface chamber extending horizontally from the crank case of the engine, the outlet of said carburetor extending through said flat surface adjacent one end thereof, a thin elongated reed valve with spring characteristics having one end secured to the other end of said flat upper surface, its free end adapted to yieldingly close said carburetor outlet and act as an inlet valve to the engine, an oil chamber having an aperture which extends through said flat surface and in proximity to said carburetor outlet and adapted to be closed by said reed valve when the carburetor outlet is closed, whereby oil will be metered into the crank case relative to the volume of mixture admitted into the crank case of the engine.

3. A device as recited in claim 2 including, a needle valve in said oil aperture adapted to provide a manual control adjustment as a supplement to said reed valve oil control.

4. In a two cycle internal combustion engine inlet valve, comprising an elongated port having a flat surface with one end adapted to be connected to an engine crank case, said flat surface having an opening at one end adapted to be connected to the outlet of a carburetor, an oil chamber having an outlet into said flat surface and in proximity to said opening, an elongated flat reed valve having spring characteristics secured at one end to said flat surface and on the opposite end from said openings and adapted at its free end to normally yieldingly close said openings, whereby the volume flow of mixture from the carburetor will cause the oil to be metered in substantially the correct proportion into the crank case of the engine.

5. A device as recited in claim 4 including, a needle valve in said oil outlet adapted to provide a manual oil control adjustment as a supplement to said reed valve control.

6. A 2 cycle internal combustion engine including a pumping unit, an engine fuel controlling means, an operating connection between said engine and pump having means whereby when the engine is reduced to an idling speed, the operating connection will be made inoperative, a lubricating oil compartment adjacent said fuel controlling means, an elongated flat upper surface port extending from the crank case of the engine, said fuel controlling means having an outlet which extends through said flat upper surface adjacent the crank case chamber, a thin elongated reed valve with spring characteristics having its outer end secured to the outer end of said upper flat surface, the free end of said valve adapted to lie on said flat upper surface, an outlet from said lubricating oil compartment, extending through said flat upper surface adjacent said fuel controlling means outlet and adapted to be closed when the valve is closed, whereby when the valve is lifted by the normal operation of the engine a predetermined quantity of lubricating oil will be permitted to pass into the crank chamber with the fuel.

WILLIAM G. KRENZKE,
Administrator of the Estate of William F. Krenzke, Deceased.

REFERENCES CITED

The following references are of record in the file of this patent:

UNITED STATES PATENTS

| Number | Name | Date |
| --- | --- | --- |
| 1,035,513 | Ahlberg | Aug. 13, 1912 |
| 1,087,387 | Lemp | Feb. 17, 1914 |
| 1,619,894 | Swartz | Mar. 8, 1927 |
| 1,733,431 | Sherman | Oct. 29, 1929 |
| 1,817,127 | Crockett | Aug. 4, 1931 |
| 2,045,094 | Oishei | June 23, 1936 |
| 2,273,202 | Jackson | Feb. 17, 1942 |